United States Patent
Jacobs et al.

(10) Patent No.: US 8,151,694 B2
(45) Date of Patent: Apr. 10, 2012

(54) BEVERAGE FORMING APPARATUS WITH CENTRIFUGAL PUMP

(75) Inventors: William T. Jacobs, Lynnfield, MA (US); James E. Shepard, Marblehead, MA (US); Kevin P. Sullivan, Wakefield, MA (US); Ian Tinkler, Wakefield, MA (US)

(73) Assignee: Keurig, Incorporated, Reading, MA (US)

( * ) Notice: Subject to any disclaimer, the term of this patent is extended or adjusted under 35 U.S.C. 154(b) by 886 days.

(21) Appl. No.: 12/184,442

(22) Filed: Aug. 1, 2008

(65) Prior Publication Data

US 2010/0024658 A1    Feb. 4, 2010

(51) Int. Cl.
*A47J 31/36*    (2006.01)

(52) U.S. Cl. ........ 99/302 R; 99/300; 99/302 C; 426/433

(58) Field of Classification Search ............ 99/280–285, 99/299, 295, 300, 306; 426/433
See application file for complete search history.

(56) References Cited

U.S. PATENT DOCUMENTS

| | | | |
|---|---|---|---|
| 3,131,637 A | | 5/1964 | Jennings |
| 3,575,521 A | * | 4/1971 | Porter et al. .................... 415/27 |
| 3,699,944 A | | 10/1972 | Karlen |
| 3,940,058 A | * | 2/1976 | Norris ........................... 237/9 R |
| 4,927,337 A | | 5/1990 | Lustwerk |
| 5,269,664 A | | 12/1993 | Buse |
| 5,314,302 A | | 5/1994 | Kakizawa et al. |
| 6,098,525 A | | 8/2000 | Gijzel et al. |
| 6,786,134 B2 | | 9/2004 | Green |
| 7,043,149 B2 | | 5/2006 | Morimoto et al. |
| 7,503,253 B2 | * | 3/2009 | Rahn ............................... 99/280 |
| 7,640,845 B2 | * | 1/2010 | Woodnorth et al. ........... 99/300 |
| 2003/0145736 A1 | | 8/2003 | Green |
| 2005/0236431 A1 | | 10/2005 | Rahn |
| 2006/0174773 A1 | * | 8/2006 | Taylor ............................. 99/280 |
| 2007/0077155 A1 | | 4/2007 | Shah et al. |

FOREIGN PATENT DOCUMENTS

| | | |
|---|---|---|
| EP | 0850586 A1 | 1/1998 |
| JP | 01056021 A * | 3/1989 |
| WO | WO 2005/060800 A1 | 7/2005 |
| WO | WO 2007/033016 A1 | 3/2007 |

OTHER PUBLICATIONS

International Preliminary Report on Patentability from PCT Application No. PCT/US2009/004350 dated Jul. 15, 2010.

* cited by examiner

*Primary Examiner* — Henry Yuen
*Assistant Examiner* — Jianying Atkisson
(74) *Attorney, Agent, or Firm* — Wolf, Greenfield & Sacks, P.C.

(57) ABSTRACT

A beverage forming apparatus includes a storage tank, and a centrifugal pump having an inlet connected to the storage tank by a supply conduit. The centrifugal pump may include a priming vent located below a full level of the storage tank and permit air to vent as liquid primes the pump. A metering tank may have an inlet connected to the centrifugal pump by a pump conduit, and an outlet connected to a brew chamber that forms a beverage using liquid received from the metering tank. In one embodiment, a flow control valve, such as a check valve, may be provided in the pump conduit to allow flow from the pump to the metering tank, but resist flow in reverse. In another embodiment, a vent valve in the pump conduit may be arranged to vent at least a portion of the pump conduit, e.g., to ambient air pressure.

23 Claims, 4 Drawing Sheets

BEVERAGE FORMING APPARATUS WITH CENTRIFUGAL PUMP

BACKGROUND

1. Field of Invention

This invention relates to beverage forming machines, such as beverage brewing machines that form a beverage using a cartridge.

2. Related Art

Beverage forming machines commonly include a water supply, such as a storage tank or plumbed connection to a municipal source. Particularly for machines having a storage tank, a pump or other device is often needed to deliver water from the storage tank to various parts of the machine, such as a brew chamber where the water is mixed with a beverage medium to form a beverage.

Some coffee brewers made by Keurig, Incorporated of Reading, Mass. include a solenoid-operated pump to deliver water from a storage tank to a metering chamber where the water is heated. The solenoid-operated pumps include one or more check valves or other backflow preventer that prevents water from flowing in reverse direction from the metering tank to the storage tank.

SUMMARY OF INVENTION

The inventors have appreciated that solenoid-operated pumps in some circumstances can make more noise than is desired. However, these pumps provide a benefit in that they are self-priming, whereas many other pumps are not. A self-priming feature of a pump can be advantageous, e.g., when first introducing water to a brewer or other beverage forming apparatus, or when the beverage forming apparatus has a removable water storage tank. That is, when a brewer is first used or when a water storage tank is removed from the brewer, air may be introduced into the water supply. Such air may cause a non-self priming pump to become air bound and fail in pumping water from the storage tank to other portions of the brewer when the storage tank is re-connected to the brewer. This can present a significant problem, especially where the home user has no way in which to prime the pump. It is believed that manufacturers of home beverage forming apparatus, such as coffee brewers, have not used non-self priming pumps for this reason. For example, a brewer manufacturer that uses a non-self priming pump that somehow becomes air bound and is incapable of pumping brew water will render the brewer useless.

Aspects of the invention provide the ability to employ a non-self-priming pump type, such as a centrifugal pump, in a brewer or other beverage forming apparatus, even when the brewer includes a removable water storage tank. For example, in one aspect of the invention, a centrifugal pump includes a priming vent that allows water to flow into the pump to a sufficient level to allow the pump to prime itself. The priming vent may remain permanently open, yet not interfere with pump operation, e.g., allow the pump to develop sufficient pressure to provide water suitable for brewing. The priming vent may be connected to the storage tank, e.g., so that any flow occurring from the priming vent during pump operation can be routed into the water storage tank for re-supply to the pump. The priming vent may be positioned below a full level of the storage tank where a top level of water in the tank is located when the storage tank is full. This may help gravity-fed water to flow into the pump for priming.

In another aspect of the invention, a liquid supply circuit that provides liquid from a storage tank to a metering tank may include a centrifugal pump and a check valve or other backflow preventer downstream of the pump that opens to allow one-way flow when there is a suitable pressure difference across the device. The backflow preventer may allow the pump to deliver liquid to the metering tank, yet prevent flow from the metering tank to the pump, e.g., caused by a siphon. Even if the backflow preventer prevents liquid from flowing under the pull of gravity from the storage tank to the centrifugal pump to prime the pump, e.g., because the pressure developed by gravity is not sufficient to open the check valve or other device, the priming vent in the centrifugal pump may allow sufficient flow of liquid and venting of air to allow the pump to be primed. In one embodiment, the priming vent may remain open at all times, even during operation of the pump, thus allowing a relatively inexpensive priming arrangement that does not require valve opening/closing control.

Another aspect of the invention provides for a vent in a conduit between a pump and a metering tank in a brewer, e.g., to help prevent a backflow of liquid from the metering tank to the pump and/or to help resist leaking of a backflow preventer, such as a check valve, in the conduit. The inventors have found that a check valve in a conduit between a supply pump and a metering tank that is intended to prevent backflow from the metering tank to the pump can sometimes leak, particularly if the pressure in the conduit downstream of the check valve is relatively high. In accordance with aspects of the invention, a vent is provided to relieve pressure in the conduit downstream of the backflow preventer, thereby helping to resist unwanted backflow of liquid. In another aspect of the invention, the vent may break a siphon in the conduit between the pump and the metering tank. This may also help prevent unwanted backflow, even if there is no check valve or other backflow preventer. In one embodiment, the conduit between the pump and the metering tank may be routed to a point above a top of the metering tank so that formation of a gravity-driven siphon can be prevented.

In another aspect of the invention, a beverage forming apparatus includes a storage tank to hold a supply of liquid where the liquid has a full level when the storage tank is full of liquid, and a centrifugal pump having a priming vent and an inlet connected to the storage tank by a supply conduit. The priming vent may be located below the full level of the storage tank and permit air in the centrifugal pump to vent as liquid from the storage tank fills the pump, e.g., under the force of gravity. A metering tank has an inlet connected to an outlet of the centrifugal pump by a pump conduit, and an outlet, and a brew chamber is connected to the outlet of the metering tank by a metering tank conduit and forms a beverage using liquid received from the metering tank.

In one embodiment, a flow control valve, such as a check valve, may be optionally provided in the pump conduit to allow flow from the pump to the metering tank, but resist flow in the pump conduit from the metering tank to the pump. In another embodiment, a vent valve in the pump conduit may be arranged to vent at least a portion of the pump conduit to a pressure different from a pressure in the pump conduit, e.g., vent the pump conduit portion to ambient air pressure. Thus, the flow control valve and the vent valve may both be included together in the apparatus, or may be used alone.

In one embodiment, the vent valve and the priming vent may be connected to the storage tank by a common conduit. The vent valve may connect to the pump conduit downstream of the flow control valve (if provided) at a point above a top of the metering tank. Such an arrangement may help break a siphon that might otherwise form between the metering tank and the centrifugal pump.

In another embodiment, the priming vent may always be open and connected to ambient air pressure. For example, the priming vent may include a suitably sized orifice that allows sufficient flow of air to prime the centrifugal pump, yet restrict flow of liquid so as prevent substantial leakage while the pump is operating.

In one embodiment, an air pump may deliver pressurized air to the metering tank to force liquid from the metering tank to the brew chamber. For example, the centrifugal pump may provide a desired volume of liquid to the metering tank (e.g., as measured by a conductive probe or other level sensor in the metering tank), which is then forced out of the metering tank by the air pump pressurizing the tank and forcing liquid out of the metering tank conduit to the brew chamber. A heater may be provided to heat the liquid in the metering tank or otherwise heat liquid provided to the brew chamber.

These and other aspects of the invention will be apparent from the following description and claims.

BRIEF DESCRIPTION OF DRAWINGS

Aspects of the invention are described below with reference to the following drawings in which like numerals reference like elements, and wherein.

DETAILED DESCRIPTION

It should be understood that aspects of the invention are described herein with reference to the figures, which show illustrative embodiments in accordance with aspects of the invention. The illustrative embodiments described herein are not necessarily intended to show all aspects of the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

Figure 1:
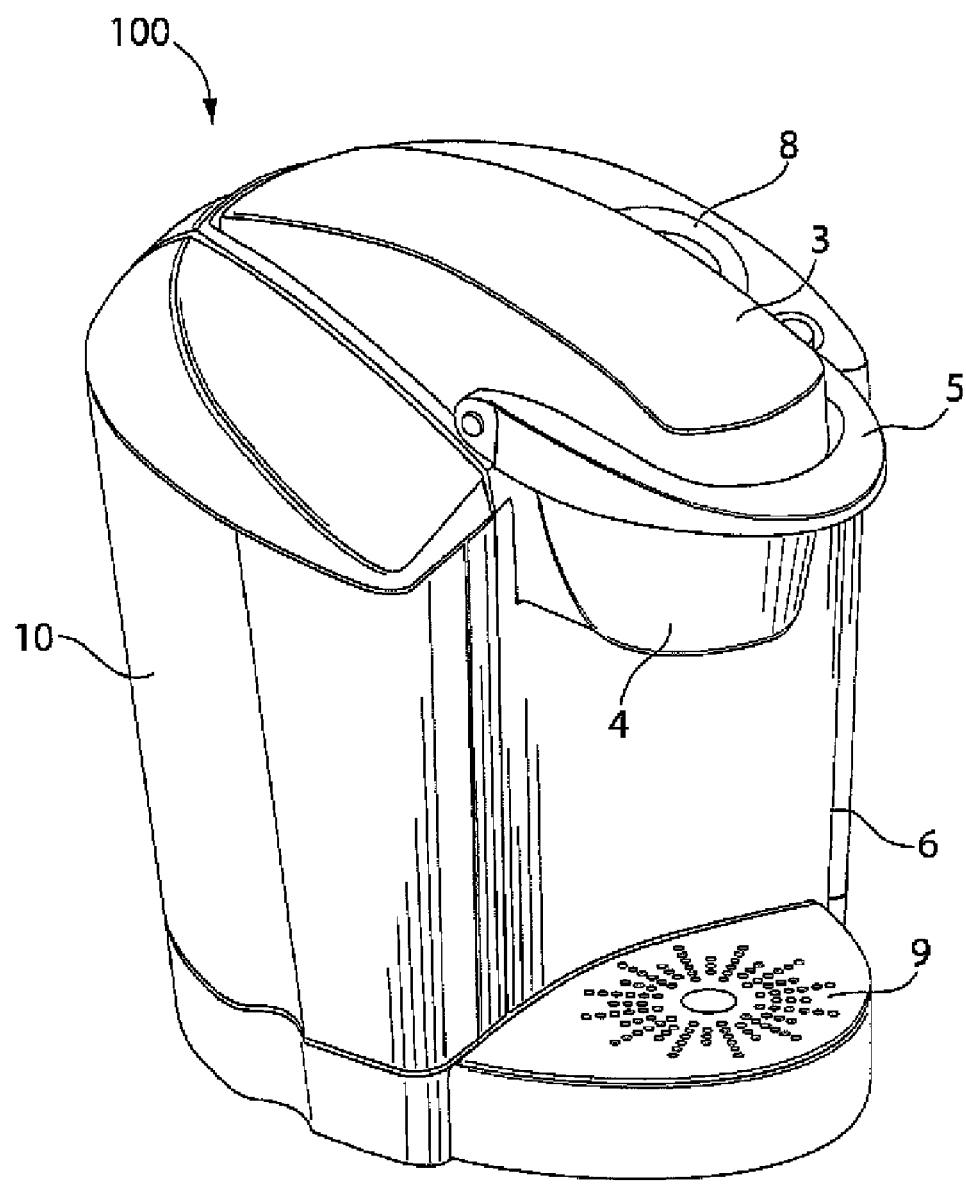
FIG. 1 is a perspective view of a beverage forming apparatus.
Figure 2:
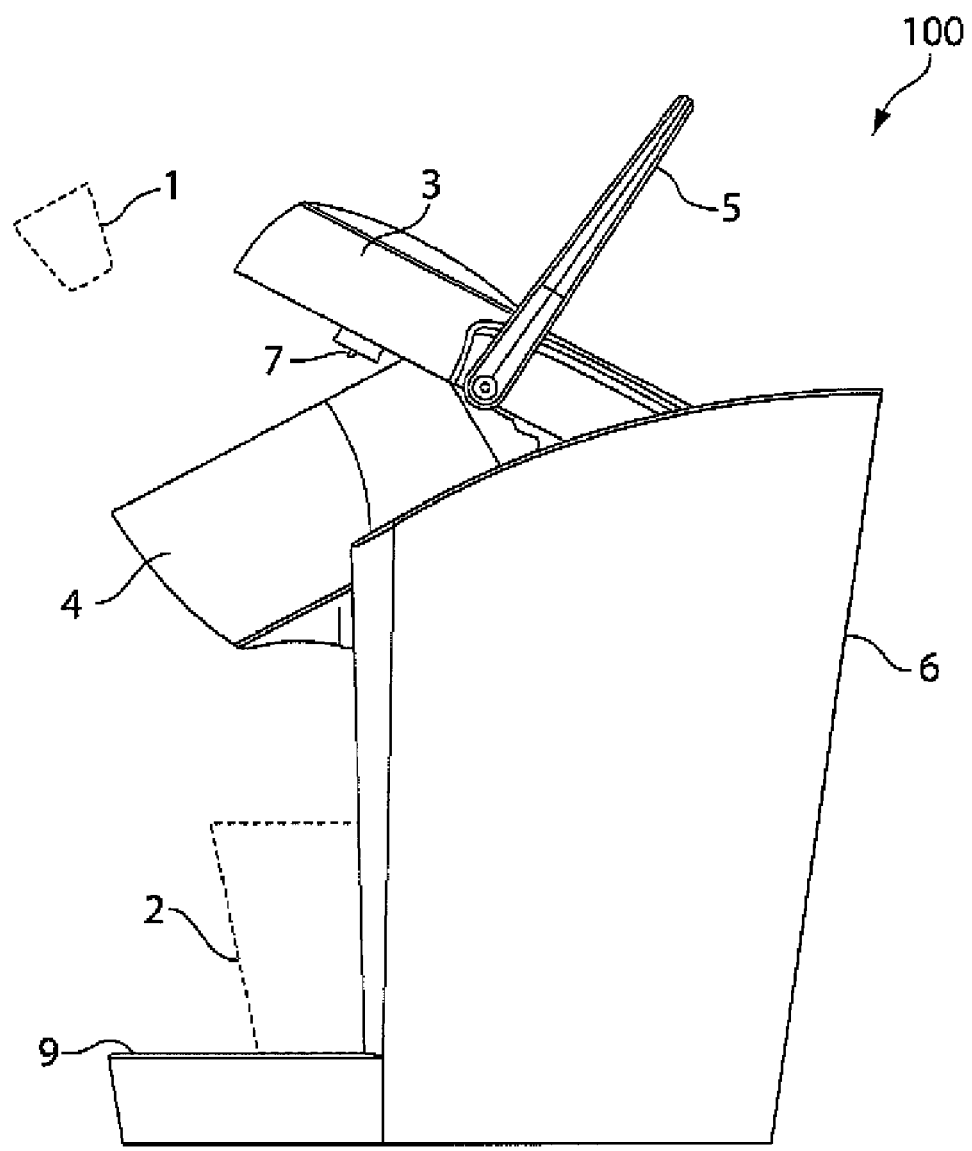
FIG. 2 is a side view of the beverage forming apparatus receiving a beverage cartridge.

FIGS. 1 and 2 show a perspective view and a side view, respectively, of a beverage forming apparatus 100 that incorporates one or more aspects of the invention. Although the beverage forming apparatus 100 may be used to form any suitable beverage, such as tea, coffee, other infusion-type beverages, beverages formed from a liquid or powdered concentrate, or other, in this illustrative embodiment, the apparatus 100 is arranged to form coffee or tea beverages. In this embodiment, the apparatus 100 includes an outer frame or housing 6 with a user interface 8 that the user may operate to control various features of the apparatus 100. As is known in the art, a beverage cartridge 1 (see FIG. 2) may be provided to the apparatus 100 and used to form a beverage that is deposited into a cup 2 or other suitable container that is placed on a drip tray 9 or other support, if any. The cartridge 1 may be manually or automatically placed in a cartridge receiving portion defined by first and second portions 3 and 4 of the beverage forming apparatus 100. For example, by lifting a handle 5, the user may move the first and second portions 3 and 4 to an open position to expose a cup-shaped or otherwise suitably shaped area in which the cartridge 1 may be placed. After placement of the cartridge 1, a handle 5 or other actuator may be moved in a manual or automatic fashion so as to move the first and second portions 3 and 4 to a closed position (shown in FIG. 1), thereby at least partially enclosing the cartridge 1 within a brew chamber. It should be understood, however, that the cartridge 1 may be received in any suitable way by the apparatus 100, as the way in which the apparatus 100 receives or otherwise uses the cartridge 1 is not critical to aspects of the invention.

Once the cartridge 1 is received, the beverage forming apparatus 100 may use the cartridge 1 to form a beverage. For example, one or more inlet needles 7 associated with the first portion 3 may pierce the cartridge 1 so as to inject heated water or other liquid into the cartridge 1. The injected liquid may form the desired beverage or a beverage precursor (i.e., a substance used in a further operation to form a beverage, such as by the addition of milk, a flavoring, etc.). As is known in the art, the cartridge 1 may take any suitable form such as those commonly known as a sachet, pod, capsule, container or other. For example, the cartridge 1 may include an impermeable outer covering within which is housed a beverage medium, such as roasted and ground coffee or other. The cartridge 1 may also include a filter so that a beverage formed by interaction of the liquid with the beverage medium passes through the filter before entering the container 2. As will be understood by those of skill in the art, cartridges in the form of a pod (e.g., having opposed layers of permeable filter paper encapsulating a beverage medium) may use the outer portion of the cartridge 1 to filter the beverage formed. The second portion 4 may also include one or more outlet needles or other elements to puncture or pierce the cartridge 1 (as needed) at an outlet side to permit the formed beverage to exit the cartridge 1. Other arrangements are possible however, e.g., the cartridge may have a permeable lower portion, may open upon introduction of liquid under pressure in the cartridge, etc.

Figure 3:
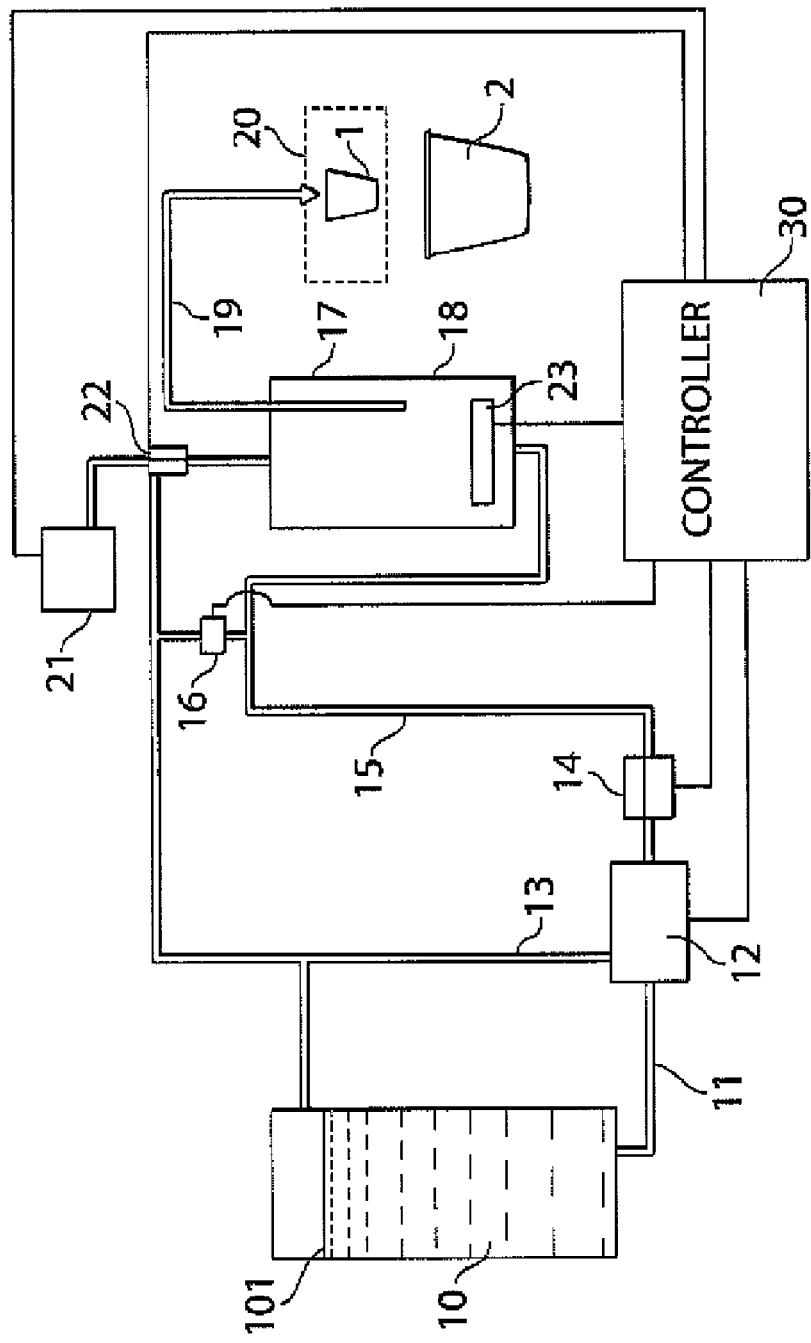
FIG. 3 is a schematic block diagram of selected components of the beverage forming apparatus in an illustrative embodiment.

FIG. 3 shows a schematic block diagram of various components included in a beverage forming system apparatus 100 in accordance with aspects of the invention. Water or other liquid from a storage tank 10 may be provided via a supply conduit 11 to a centrifugal pump 12, which pumps the liquid via a pump conduit 15 to a metering tank or chamber 18. Operation of the water pump 12 and other components of the apparatus 100 may be controlled by a controller 30, e.g., including a programmed processor and/or other data processing device along with suitable software or other operating instructions, one or more memories, temperature and liquid level sensors, pressure sensors, input/output interfaces, communication buses or other links, a display, switches, relays, triacs, or other components necessary to perform desired input/output or other functions. The metering tank 18 may be filled with a desired amount of liquid by any suitable technique, such as running the pump 12 for a predetermined time, sensing a water level in the metering tank 18 using a conductive probe sensor or capacitive sensor, detecting a pressure rise in metering tank 18 when the liquid fills the tank, or using any other viable technique. For example, the controller 30 may detect that the metering tank 18 is completely filled when a pressure sensor detects a rise in pressure indicating that the water has reached the top of the metering tank 18. Water in the tank may be heated, if desired, by way of a heating element 23 whose operation is controlled by the controller 30 using input from a temperature sensor or other suitable input. Water in the metering tank 18 may be dispensed via a metering tank conduit 19 to a brew chamber 20 or other beverage forming station. The brew chamber 20 may include any beverage making ingredient, such as ground coffee, tea, a flavored drink mix, or other substance, e.g., contained in a cartridge 1. Liquid may be discharged from the metering tank 18 by pressurizing the metering tank with air provided by an air pump 21 that causes the liquid to be discharged out of a tube 17 and into the metering tank conduit 19. Completion of the dispensing from the metering tank 18 may be detected in any suitable way, such as by detecting a pressure drop in the metering tank 18, by detecting a water level change in the metering tank 18, or using any other viable techniques. Liquid may alternately be discharged from the metering tank 18 by the pump 12 operating to force additional liquid into the tank 18, thereby displacing water out of the tank 18 and to the brew chamber. A flow sensor or other suitable device may be used to determine the amount of liquid delivered to the tank 18, and thus the amount of liquid delivered to the brew chamber.

In one aspect of the invention, the beverage forming apparatus may include a centrifugal pump that provides liquid from a storage tank to a metering tank and/or brew chamber. In one embodiment, the storage tank 10 may be removable from the apparatus 100, e.g., at a connection in the supply conduit 11. As mentioned above, disconnection of the storage tank 10 from the supply conduit 11, the storage tank 10 being completely emptied (or "run dry"), or a first-time operation of the apparatus 100 may introduce air into the supply conduit 11. Many centrifugal pumps are not able to suitably prime themselves in a situation where air is present in the pump body and/or a supply conduit to the pump. In accordance with an aspect of the invention, the centrifugal pump 12 may include a priming vent 13 that allows air to escape from the supply conduit 11 and/or the pump 12 chamber, thus allowing liquid to flow from the storage tank 10 and into the conduit 11 and/or the pump 12. The priming vent 13 may be located below a full level 101 of the storage tank 10, i.e., level of the top of liquid in the storage tank 10 when the tank 10 is full. Accordingly, gravity may cause liquid to flow into the supply conduit 11 and pump 12 as air is vented by the priming vent 13. The priming vent 13 need not allow the supply conduit 11 and pump 12 to fill completely with liquid. Instead, the filling may be only sufficient to allow the pump 12 to fully prime itself during initial operation.

In one illustrative embodiment, the priming vent 13 may be permanently open, i.e., may include a passageway that is not intended to be closed. For example, the priming vent 13 may include a suitably sized orifice (e.g., having a diameter of about 1-3 mm, although other larger or smaller sizes are possible) that allows air to pass relatively freely, but functions as a suitable flow restrictor for liquid flow so that leakage through the priming vent 13 has no significant impact on the centrifugal pump's 12 ability to provide liquid to the metering tank 18. The priming vent 13 may vent to ambient air pressure, and may connect to the storage tank 10 above, at or below the full level 101. A connection of the priming vent 13 to the storage tank 10 may allow liquid that leaks through the priming vent 13 during pump 12 operation to be collected and provided back to the pump 12.

In accordance with another aspect of the invention, the apparatus may include a flow control valve in the pump conduit that permits flow from the centrifugal pump to the metering tank, but resists flow from the metering tank to the centrifugal pump. In one embodiment, the flow control valve 14 may be a check valve. However, the flow control valve 14 may take other suitable forms, such as other passive one-way valves, an electrically- or pneumatically-controlled valve that operates under the control of the controller 30, etc. (FIG. 3 shows a control line between the flow control valve 14 and the controller 30, but it should be understood that such a control line is unnecessary if the flow control valve 14 is a check valve or other passive device.) Thus, the flow control valve 14 may allow flow from the pump 12 to the metering tank 18 while the pump 12 is running, but resist flow from the metering tank 18 to the pump 12 when the pump 12 is not operating. This arrangement may help prevent backflow of liquid from the metering tank 18 to the pump 12, e.g., under the force of gravity by way of a siphon, or when the air pump 21 pressurizes the metering tank 18 to force water from the metering tank 18 to the brew chamber 20. Inclusion of a flow control valve 14 may also make the inclusion of a priming vent 13 important since the flow control valve 14 may prevent flow through the pump conduit 15 which would otherwise aid in pump priming. For example, if the flow control valve 14 is a check valve, the crack, or opening, pressure required to open the valve may be greater than the pressure present in the pump conduit 15 when the pump is not running. (The pressure in the pump conduit 15 in such circumstance may be a function of the height of the liquid in the storage tank 10.) As a result, flow may not occur from the pump 12 to the metering tank 18 under the force of gravity. However, the presence of the priming vent 13 may allow flow sufficient to prime the centrifugal pump 12, as mentioned above. (In another embodiment in which the priming vent is not included, the crack pressure of the check valve may be suitably low, or the flow control valve may be otherwise arranged to allow flow between the storage tank 10 and the pump 12 suitable for priming the pump.)

In another aspect of the invention, the apparatus may include a vent valve in the pump conduit, e.g., to relieve pressure in the pump conduit and/or to break a siphon that might otherwise form in the pump conduit. The vent valve may be located at a point above a top of the metering tank, e.g., to ensure that upon venting, a siphon that might cause flow from the metering tank to the centrifugal pump is broken. In this illustrative embodiment, the vent valve 16 is an electrically-controlled solenoid valve that opens and closes at the control of the controller 30. When the centrifugal pump 12 is running, the vent valve 16 is closed, allowing flow through the pump conduit 15 to the metering tank 18. However, when the pump 12 is stopped, the vent valve 16 may be opened, possibly only briefly, to vent the pump conduit 15 at a point above the metering tank top to ambient air pressure. This venting may relieve pressure in the pump conduit 15 built up by operation of the centrifugal pump 12 and/or pressure built up by the air pump 21 pressurizing the metering tank 18. In some cases, the inventors have found that pressure in the pump conduit 15 may cause a flow control valve 14 (e.g., a check valve) to undesirably leak in the direction from the metering tank 18 to the pump 12. By relieving excess pressure, the flow control valve 14 may be prevented from leaking. Also, by venting the pump conduit 15 at a point above the top of the metering tank 18, a siphon that might cause flow from the metering tank 18 toward the pump 12 can be broken. This siphon break can be advantageous when a flow control valve 14 is not provided or has poor low pressure performance.

As can be seen in FIG. 3, the vent valve 16 may vent the pump conduit 15 to the storage tank 10 or other suitable location. As also shown, in one embodiment, a metering tank vent valve 22 (which is opened to allow air to vent when the metering tank 18 is being filled with liquid by the centrifugal pump 12 and is closed when the air pump 21 pressurizes the tank 18 to force water to the brew chamber) may also be connected to the storage tank 10. In this way, any liquid that is vented from the pump conduit 15 and/or the metering tank 18 can be routed to the storage tank 10 or other location.

As implied above, various aspects of the invention may be used alone and/or in any suitable combination. For example, although FIG. 3 shows an apparatus 100 with a priming vent 13, a flow control valve 14 and a vent valve 16, other embodiments may use only the priming vent 13, only the flow control valve 14, only the vent valve 16, or combinations of the priming vent 13 and flow control valve 14, priming vent 13 and vent valve 16, or flow control valve 14 and vent valve 16. When using the priming vent 13 only, air may be prevented from entering the metering tank 18 when the apparatus 100 is idle, thereby preventing liquid from siphoning from the metering tank 18 to the pump 12. When using the vent valve 16 alone, the vent valve 16 may be opened to allow flow for priming the centrifugal pump 12, as well as opened after metering tank 18 fill to break a possible siphon. When using the flow control valve 14 alone, the flow control valve 14 may be arranged to allow flow at a low crack pressure, suitable to allow priming of the centrifugal pump 12. Of course, it should be understood that the flow control valve 14 and vent valve 16 may be combined into a single three way valve, if desired.

Figure 4:
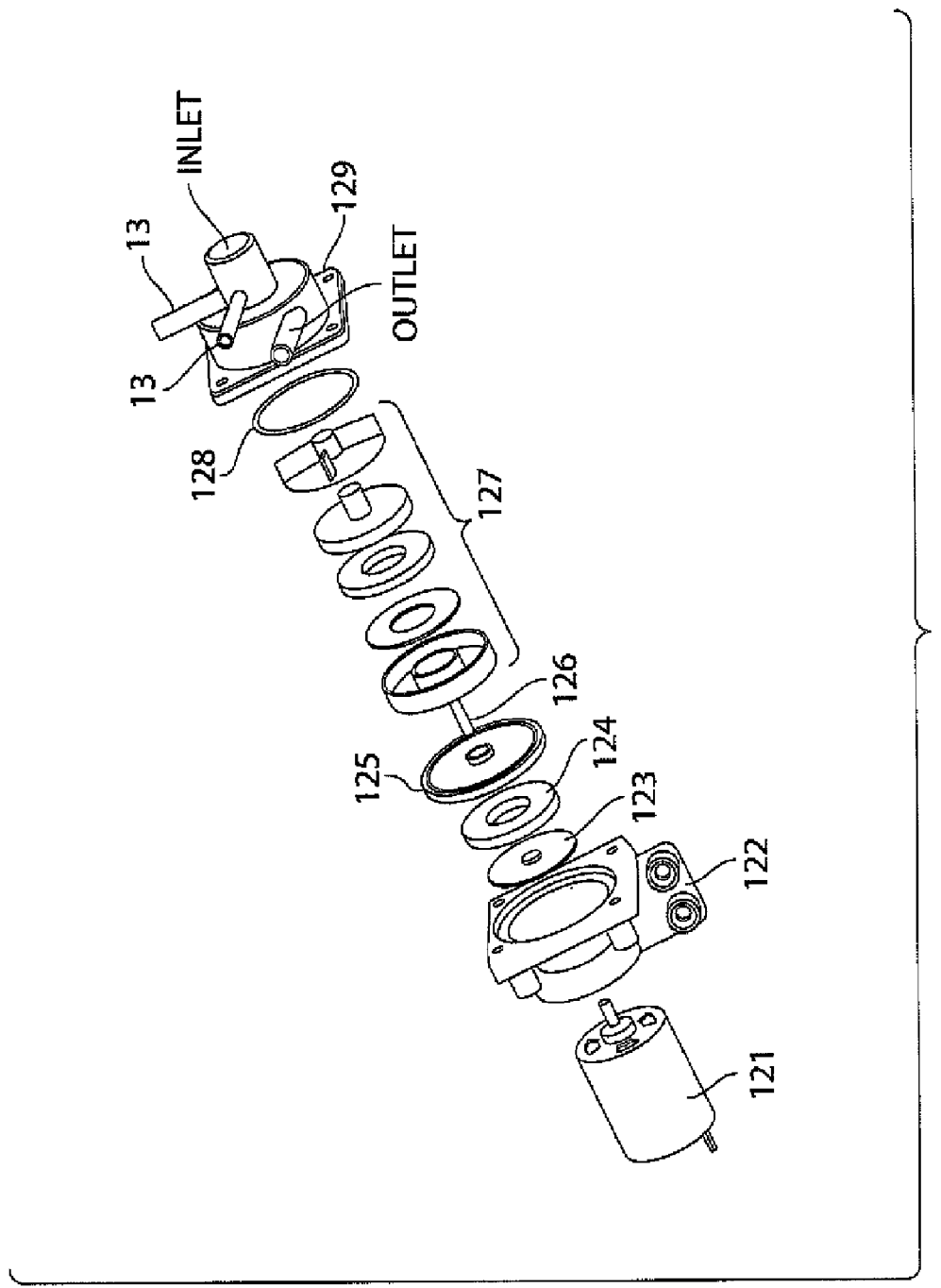
FIG. 4 is an exploded view of a centrifugal pump in an illustrative embodiment.

FIG. 4 shows an illustrative centrifugal pump 12 that may be used with aspects of the invention, although any suitable centrifugal pump arrangement may be used with aspects of the invention. In this illustrative embodiment, the pump 12 includes a motor 121 and an impeller base 122 that is fixed to the motor 121. A magnet clamp plate 123 and magnet 124 are fixed to the motor 121 shaft and are used to drive the pump impeller. A sealing plate 125 is fitted over the magnet 124 and engages with the impeller base 122 to prevent liquid in the pump chamber from leaking. Thus, the magnet 124 is located on the "dry" side of the sealing plate 125, outside of the pump chamber where the impeller 127 is located. A shaft 126 is located on the sealing plate 125 in the pump chamber and an impeller 127 is mounted on the shaft 126. The impeller 127 includes several components that are joined together to form an integral unit, including (from left to right as shown in FIG. 4) a bracket, a metal plate, a magnet, a magnet cover and impeller blade. The magnet in the impeller 127 magnetically couples with the magnet 124 so that as the magnet 124 is rotated by the motor 121, the impeller 127 rotates to pump liquid through the pump chamber from the inlet to the outlet. A seal ring 128 is placed between the base 122 and a cover 129, and the base 122 and cover 129 are secured together. The cover 129 includes the pump inlet and outlet, as well as two priming vents 13. The two priming vents 13 may be provided at different angles to accommodate different positions of the pump 12 relative to gravity and allow suitable venting. Of course, only one priming vent 13 may be provided, and the vent 13 may be provided in any suitable location.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A beverage forming apparatus, comprising:
a storage tank to hold a supply of liquid, the liquid having a full level when the storage tank is full of liquid;
a centrifugal pump having a pump body, a priming vent at the pump body, an outlet, and an inlet connected to the storage tank by a supply conduit, the priming vent being located below the full level of the storage tank and permitting air in the centrifugal pump to vent as liquid from the storage tank fills the pump;
a metering tank having an inlet connected to the outlet of the centrifugal pump by a pump conduit, and an outlet;
a metering tank vent connected between the metering tank and the storage tank and arranged to allow fluid flow from the metering tank to the storage tank during filling of the metering tank by the centrifugal pump;
a pump conduit vent downstream of the centrifugal pump and arranged at a point above a top fluid level in the metering tank to break a siphon in the pump conduit; and
a brew chamber connected to the outlet of the metering tank by a metering tank conduit and for forming a beverage using liquid received from the metering tank.

2. The apparatus of claim 1, further comprising:
a flow control valve in the pump conduit that allows flow from the pump to the metering tank and resists flow in the pump conduit from the metering tank to the pump; and
wherein the pump conduit vent includes a pump conduit vent valve arranged to open to vent at least a portion of the pump conduit to a pressure different from a pressure in the pump conduit.

3. The apparatus of claim 2, wherein the flow control valve is a check valve.

4. The apparatus of claim 2, wherein the pump conduit vent valve is arranged to selectively vent the pump conduit to ambient air pressure.

5. The apparatus of claim 2, wherein the pump conduit vent valve and the priming vent are connected to the storage tank by a common conduit.

6. The apparatus of claim 2, wherein the pump conduit vent valve connects to the pump conduit at a point above a top of the metering tank.

7. The apparatus of claim 2, wherein the metering tank vent includes a metering tank vent valve to control fluid flow from the metering tank to the storage tank.

8. The apparatus of claim 1, wherein the priming vent includes an orifice that is open to ambient air pressure.

9. The apparatus of claim 1, further comprising:
an air pump that delivers pressurized air to the metering tank to force liquid from the metering tank to the brew chamber.

10. The apparatus of claim 1, further comprising:
a heater that heats the liquid in the metering tank.

11. A beverage forming apparatus, comprising:
a storage tank to hold a supply of liquid, the liquid having a full level when the storage tank is full of liquid;
a centrifugal pump having a pump body, a priming vent at the pump body, an outlet, and an inlet connected to the storage tank by a supply conduit, the priming vent being located below the full level of the storage tank and permitting air in the centrifugal pump to vent as liquid from the storage tank fills the pump;
a metering tank having an inlet connected to the outlet of the centrifugal pump by a pump conduit, and an outlet;
a metering tank vent arranged to allow fluid flow from the metering tank during filling of the metering tank by the centrifugal pump;
a flow control valve in the pump conduit that allows flow from the centrifugal pump to the metering tank and resists flow from the metering tank to the centrifugal pump;
a pump conduit vent downstream of the flow control valve arranged at a point above a top fluid level in the metering tank to break a siphon in the pump conduit; and
a brew chamber connected to the metering tank by a metering tank conduit and for forming a beverage using liquid received from the metering tank.

12. The apparatus of claim 11, wherein the flow control valve is a check valve.

13. The apparatus of claim 11, wherein the vent valve is a solenoid-controlled valve.

14. The apparatus of claim 11, wherein the priming vent includes an orifice that is open to ambient air pressure.

15. The apparatus of claim 11, wherein:
the pump conduit vent includes a vent valve arranged to vent at least a portion of the pump conduit downstream of the flow control valve to a pressure different from a pressure in the pump conduit.

16. A beverage forming apparatus, comprising:
a storage tank to hold a supply of liquid, the liquid having a full level when the storage tank is full of liquid;
a centrifugal pump having a pump body, a priming vent at the pump body, an outlet, and an inlet connected to the storage tank by a supply conduit, the priming vent being located below the full level of the storage tank and permitting air in the pump to vent as liquid from the storage tank fills the pump;
a metering tank having an inlet connected to the outlet of the centrifugal pump by a pump conduit, and an outlet;
a metering tank vent arranged to allow fluid flow from the metering tank during filling of the metering tank by the centrifugal pump;
a vent valve in the pump conduit arranged at a point above a top fluid level in the metering tank to vent at least a portion of the pump conduit to a pressure different from a pressure in the pump conduit to break a siphon in the pump conduit; and
a brew chamber connected to the metering tank by a metering tank conduit and for forming a beverage using liquid received from the metering tank.

17. The apparatus of claim 16, further comprising:
a flow control valve in the pump conduit that allows flow from the pump to the metering tank and resists flow in the pump conduit from the metering tank to the pump.

18. The apparatus of claim 17, wherein the vent valve is connected to the pump conduit at a point above a top of the metering tank between the flow control valve and the metering tank.

19. The apparatus of claim 16, further comprising:
a controller that controls the operation of the centrifugal pump and the vent valve.

20. The apparatus of claim 16, wherein the priming vent includes an orifice that is open to ambient air pressure.

21. A beverage forming apparatus, comprising:
a storage tank to hold a supply of liquid, the liquid having a full level when the storage tank is full of liquid;
a centrifugal pump having a pump body, a priming vent at the pump body, an outlet, and an inlet connected to the storage tank by a supply conduit, the priming vent being located below the full level of the storage tank and permitting air in the pump to vent as liquid from the storage tank fills the pump;
a metering tank having an inlet connected to the outlet of the centrifugal pump by a pump conduit, and an outlet;
a metering tank vent arranged to allow fluid flow from the metering tank during filling of the metering tank by the centrifugal pump;
a vent valve connected to the pump conduit at a point downstream from the centrifugal pump outlet and upstream from the metering tank inlet and arranged at a point above a top fluid level in the metering tank to vent at least a portion of the pump conduit to a pressure different from a pressure in the pump conduit, wherein the vent valve allows fluid to flow from the centrifugal pump to the metering tank when the vent valve is closed; and
a brew chamber connected to the metering tank by a metering tank conduit and for forming a beverage using liquid received from the metering tank.

22. The apparatus of claim 1, wherein the metering tank vent is arranged to allow fluid to bypass the pump conduit vent by allowing fluid communication between the metering tank and the storage tank.

23. The apparatus of claim 1, wherein the metering tank vent is arranged to allow fluid to bypass the priming vent by allowing fluid communication between the metering tank and the storage tank.

* * * * *